(12) United States Patent
Tanaka et al.

(10) Patent No.: US 10,570,999 B2
(45) Date of Patent: Feb. 25, 2020

(54) TOROIDAL CONTINUOUSLY VARIABLE TRANSMISSION

(71) Applicant: KAWASAKI JUKOGYO KABUSHIKI KAISHA, Kobe-shi, Hyogo (JP)

(72) Inventors: Kenichiro Tanaka, Kobe (JP); Hideyuki Imai, Akashi (JP); Hidenori Arisawa, Kakogawa (JP); Masahide Kazari, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 255 days.

(21) Appl. No.: 15/290,133

(22) Filed: Oct. 11, 2016

(65) Prior Publication Data

US 2017/0030439 A1 Feb. 2, 2017

Related U.S. Application Data

(63) Continuation of application No. PCT/JP2015/061396, filed on Apr. 13, 2015.

(30) Foreign Application Priority Data

Apr. 14, 2014 (JP) ................. 2014-082826

(51) Int. Cl.
*F16H 15/38* (2006.01)
*F16H 37/02* (2006.01)
*F16H 57/02* (2012.01)
*F16H 45/02* (2006.01)

(52) U.S. Cl.
CPC ........... *F16H 15/38* (2013.01); *F16H 37/021* (2013.01); *F16H 57/02* (2013.01); *F16H 2045/0215* (2013.01)

(58) Field of Classification Search
CPC .... F16H 15/38; F16H 37/021; F16H 57/0423; F16H 57/049
(Continued)

(56) References Cited

U.S. PATENT DOCUMENTS 2,748,614 A * 6/1956 Weisel .................... F16H 15/38
476/14
5,679,090 A 10/1997 Imanishi
(Continued)

FOREIGN PATENT DOCUMENTS

JP 09-177918 A 7/1997
JP 11-210869 A 8/1999
(Continued)

OTHER PUBLICATIONS

International Preliminary Report on Patentability dated Oct. 27, 2016 from the International Bureau in counterpart International Application No. PCT/JP2015/061396.
(Continued)

*Primary Examiner* — William C Joyce
(74) *Attorney, Agent, or Firm* — Sughrue Mion, PLLC

(57) ABSTRACT

In a continuously variable transmission including: a first transmission unit including a first input disc and a first output disc; and a second transmission unit disposed such that a back surface of a second input disc is opposed to a back surface of the first input disc, an input gear shroud covering an input gear disposed between the back surfaces of the first and second input discs, a first input disc side surface shroud integrally provided to a first input disc support supporting the first input disc on a housing of the continuously variable transmission, and a second input disc side surface shroud integrally provided to a second input disc support supporting the second input disc on the housing of the continuously variable transmission, are provided.

6 Claims, 3 Drawing Sheets

(58) Field of Classification Search
USPC .............................................. 476/40, 42, 46
See application file for complete search history.

(56) References Cited

U.S. PATENT DOCUMENTS

| | | | |
|---|---|---|---|
| 5,779,591 A | 7/1998 | Inoue | |
| 6,659,907 B2 | 12/2003 | Hirano et al. | |
| 7,014,588 B2* | 3/2006 | Miyata ................. | F16H 37/086 |
| | | | 475/214 |
| 2002/0028723 A1 | 3/2002 | Hirano et al. | |
| 2016/0102750 A1* | 4/2016 | Tanaka .................... | F16H 15/38 |
| | | | 476/8 |

FOREIGN PATENT DOCUMENTS

| | | |
|---|---|---|
| JP | 11-336868 A | 12/1999 |
| JP | 2002-081519 A | 3/2002 |
| JP | 2008-039088 A | 2/2008 |
| JP | 2008-175400 A | 7/2008 |

OTHER PUBLICATIONS

International Search Report of PCT/JP2015/061396 dated Jun. 30, 2015.
Communication dated Aug. 10, 2017, from the Canadian Patent Office in counterpart application No. 2,945,470.
Communication dated Sep. 19, 2017, from Japanese Patent Office in counterpart application No. 2014-082826.
Communication dated Nov. 14, 2017 from the European Patent Office in counterpart Application No. 15780362.8.

* cited by examiner

TOROIDAL CONTINUOUSLY VARIABLE TRANSMISSION

CROSS REFERENCE TO THE RELATED APPLICATION

This application is a continuation application, under 35 U.S.C. § 111(a), of international application No. PCT/JP2015/061396, filed Apr. 13, 2015, which claims priority to Japanese patent application No. 2014-082826, filed Apr. 14, 2014, the disclosure of which are incorporated by reference in their entirety into this application.

BACKGROUND OF THE INVENTION (Field of the Invention)

The present invention relates to a structure of a toroidal continuously variable transmission for use in, for example, an electric power generating device for an aircraft.

(Description of Related Art)

As an electric power generating device for an aircraft, it is known to use a constant frequency generator (IDG) that operates while keeping a rotation rate (frequency) of a generator constant even when a rotation rate of an aircraft engine, which is a drive source, varies. As a transmission for keeping a rotation rate of the generator constant in the IDG, a toroidal continuously variable transmission has been proposed. The toroidal continuously variable transmission includes a toroidal transmission unit that includes: an input disc and an output disc concentrically arranged so as to be opposed to each other; and a power roller that is brought into contact with opposed curved concave surfaces of both discs at high pressure. By adjusting a tilt angle of the power roller relative to both discs, it is possible to steplessly (continuously) vary a gear ratio.

Description of Related Art

In general, as a toroidal continuously variable transmission, a double-cavity-type is adopted in which the two toroidal transmission units are arranged coaxially. As a double-cavity-type toroidal continuously variable transmission, a transmission in which two discs of two toroidal transmission units which two discs are adjacent to each other at an axially central portion are integrally formed (see, e.g., Patent Document 1) and a transmission in which such two discs are formed as separate members (see, e.g., Patent Document 2) are known. In the disc-integrated-type transmission, deformation, in the axial direction, of the two discs arranged at the axially central portion is small, and the entire transmission can be configured with a small size and a light weight. Meanwhile, in the disc-separate-type transmission, since a gear for input and output can be disposed between the discs adjacent to each other at the axially central portion, the outer diameter of the gear can be reduced to suppress an increase in the circumferential speed of the gear.

RELATED DOCUMENT

Patent Document

[Patent Document 1] JP Laid-open Patent Publication No. 2002-081519

[Patent Document 2] JP Laid-open Patent Publication No. H09-177918

SUMMARY OF THE INVENTION

However, in the case where the two discs adjacent to each other at the axially central portion are integrally formed, since the gear is provided at an outer peripheral portion of the input disc, the outer diameter of the gear increases, so that the circumferential speed of the gear increases. As a result, oil agitation loss by the gear increases, so that the efficiency of the electric power generating device decreases.

On the other hand, in the case where the two discs at the axially central portion are formed as separate members, a bearing for rotatably supporting an input gear is disposed between these discs. The back surfaces of both discs are also supported by bearings disposed at positions close to the axial center. Thus, deformation of the discs supported by these bearings, that is, amounts by which the outer peripheral portions of the discs fall down in the axial direction, increases, so that the reliability of the continuously variable transmission decreases.

Furthermore, in the case of achieving a high gear ratio in the toroidal continuously variable transmission, the speed of the outer peripheral portion of the disc increases as the rotation speed of the disc of the continuously variable transmission increases, so that oil agitation resistance increases, which causes a decrease in the fuel efficiency of an aircraft in which the continuously variable transmission is used. In addition, when high-speed oil is dispersed within the device, it becomes difficult to collect and discharge the oil and reuse the oil within the device.

Therefore, in order to solve the above-described problems, an object of the present invention is to provide a double-cavity-type toroidal continuously variable transmission that can reduce oil agitation loss by a gear while suppressing an increase in the size of the continuously variable transmission and maintaining high reliability.

In order to achieve the above-described object, a toroidal continuously variable transmission according to the present invention includes: a first transmission unit including a first input disc and a first output disc disposed coaxially with each other and each having a curved concave side surface and a first power roller tiltably interposed between the first input disc and the first output disc and configured to change a speed of a driving force from the first input disc and transmit the driving force to the first output disc; a second transmission unit disposed coaxially with the first transmission unit, the second transmission unit including a second input disc and a second output disc disposed coaxially with each other and each having a curved concave side surface and a second power roller tiltably interposed between the second input disc and the second output disc and configured to change a speed of a driving force from the second input disc and transmit the driving force to the second output disc, the second transmission unit being disposed such that a back surface of the second input disc is opposed to a back surface of the first input disc; an input gear disposed between the back surface of the first input disc and the back surface of the second input disc and concentrically with the first input disc and the second input disc and having an external tooth gear connected to the first input disc and the second input disc so as to be non-rotatable relative to the first input disc and the second input disc to input power; an input gear shroud covering a portion of an outer periphery of the input gear; a first input disc support supporting the first input disc on a housing of the continuously variable transmission and a second input disc support supporting the second input disc on the housing of the continuously variable transmission; a first input disc side surface shroud integrally provided to the first input disc support and covering a portion of the side surface of the first input disc; and a second input disc side surface shroud integrally provided to the second input disc support and covering a portion of the side surface of the second input disc. In the present specification, the term "integrally provided" includes both the case of being formed as a one-piece member and the case of being fixedly provided by means of a connection member such as a bolt.

A back surface of the second output disc may be opposed to a back surface of the first output disc. In this case, the continuously variable transmission includes: an output gear disposed between the back surface of the first output disc and the back surface of the second output disc and concentrically with the first output disc and the second output disc and having an external tooth gear connected to the first output disc and the second output disc so as to be non-rotatable relative to the first output disc and the second output disc to output power; an output gear shroud covering a portion of an outer periphery of the output gear; a first output disc support supporting the first output disc on a housing of the continuously variable transmission and a second output disc support supporting the second output disc on the housing of the continuously variable transmission; a first output disc side surface shroud integrally provided to the first output disc support and covering a portion of the side surface of the first output disc; and a second output disc side surface shroud integrally provided to the second output disc support and covering a portion of the side surface of the second output disc.

According to this configuration, in a double-cavity-type toroidal continuously variable transmission, by forming two input discs adjacent to each other at an axially central portion as separate members and disposing an input gear, which inputs power to these input discs, between the back surfaces of the two discs disposed such that the back surfaces thereof are opposed to each other, the outer diameter (i.e., the circumferential speed) of the input gear can be decreased to reduce oil agitation loss by the input gear. Furthermore, by covering the input discs and the output discs with the disc shrouds, extra oil that is present around both discs is prevented from coming into contact with the surfaces of the discs, so that the oil agitation resistance can be further reduced. Moreover, since the shrouds that cover the side surfaces and the outer peripheral surfaces of the input discs are integrally provided to the input disc supports and the gear shroud, an increase in the size of the entire device is suppressed.

In one embodiment of the present invention, in the case where the back surface of the second input disc is opposed to the back surface of the first input disc, the toroidal continuously variable transmission may further include: a first input disc outer periphery shroud integrally provided to the input gear shroud and covering a portion of an outer peripheral surface of the first input disc; and a second input disc outer periphery shroud integrally provided to the input gear shroud and covering a portion of an outer peripheral surface of the second input disc. In addition, in one embodiment of the present invention, in the case where the back surface of the second output disc is opposed to the back surface of the first output disc, the toroidal continuously variable transmission may further include: a first output disc outer periphery shroud integrally provided to the output gear shroud and covering a portion of an outer peripheral surface of the first output disc; and a second output disc outer periphery shroud integrally provided to the output gear shroud and covering a portion of an outer peripheral surface of the second output disc. With such a configuration, extra oil that is present around both discs can be assuredly prevented from coming into contact with the surfaces of the discs.

In one embodiment of the present invention, additional disc side surface shrouds that cover other portions of the side surfaces of the discs whose circumferential speeds are set higher, of the first and second input discs and the first and second output discs, may be integrally provided to the first input disc support and the second input disc support, respectively. According to this configuration, by covering the other portions of the side surfaces of the discs having high circumferential speeds with the shrouds, the oil agitation resistance can be further reduced.

In one embodiment of the present invention, the input gear shroud may be fixed to the housing by a connection member that fixes the first input disc support to the housing and a connection member that fixes the second input disc support to the housing. According to this configuration, an increase in the size of the entire device can be further suppressed while the oil agitation resistance is significantly reduced as described above, and also the number of components can be reduced.

In one embodiment of the present invention, the toroidal continuously variable transmission may further include: a transmission gear engaged with the input gear to transmit power from an external power source to the input gear; and a transmission gear shroud covering a side portion and an outer periphery of the transmission gear, and an oil discharge opening is formed between the input gear shroud and the transmission gear shroud. According to this configuration, oil that is present around the input gear and the transmission gear is efficiently discharged to the outside of the shroud, so that the oil agitation resistance is significantly reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
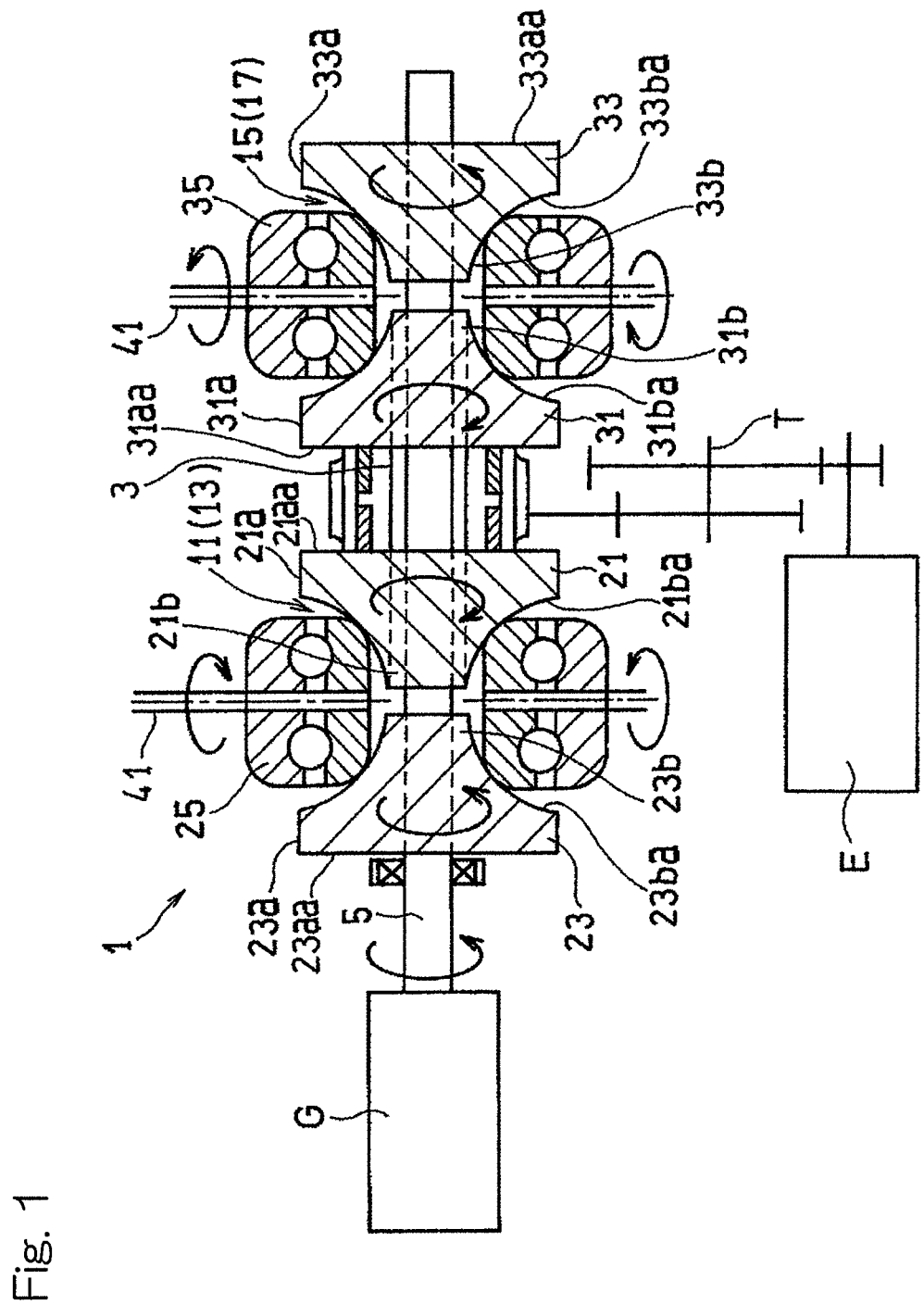
FIG. 1 is a longitudinal cross-sectional view schematically showing a schematic configuration of a toroidal continuously variable transmission according to a first embodiment of the present invention.

Hereinafter, embodiments of the present invention will be described with reference to the drawings. FIG. 1 is a longitudinal cross-sectional view schematically showing a toroidal continuously variable transmission (hereinafter, referred to simply as a "continuously variable transmission") 1 according to a first embodiment of the present invention. The continuously variable transmission 1 is provided between an aircraft engine E that is a drive source and a generator G that is a load device driven by the engine E. The continuously variable transmission 1 transmits a driving force of the engine E to the generator G while keeping a rotation rate of the generator G constant. It should be noted that FIG. 1 merely illustrates fundamental functions and configurations for a transmission, and therefore structures for supporting and structures of shrouds, which will be described later, are omitted. A constant frequency generator mainly includes the continuously variable transmission 1 and the generator G.

The engine E, which is an external power source, is connected to the input shaft 3, which is formed so as to be hollow, via a power transmission mechanism T of the continuously variable transmission 1. Power inputted to the input shaft 3 is outputted via the continuously variable transmission 1 from the output shaft 5 that is concentrically disposed at a hollow portion of the input shaft 3, to the generator G.

As shown in FIG. 1, the continuously variable transmission 1 is designed as a double-cavity-type toroidal continuously variable transmission. Specifically, the continuously variable transmission 1 includes: a first toroidal transmission unit 13 that forms a first cavity 11; and a second toroidal transmission unit 17 that forms a second cavity 15. The first toroidal transmission unit 13 and the second toroidal transmission unit 17 are disposed on the common output shaft 5 so as to be spaced apart from each other at a predetermined interval.

The first toroidal transmission unit 13 includes a first input disc 21, which is rotatably supported on the input shaft 3, a first output disc 23, which rotates in conjunction with the output shaft 5, and a plurality of (for example, two) first power rollers 25, which are interposed between the first input disc 21 and the first output disc 23. Similarly, the second toroidal transmission unit 17 includes a second input disc 31, which is rotatably supported on the input shaft 3, a second output disc 33, which rotates together with the output shaft 5, and a plurality of (e.g., two) second power rollers 35, which are interposed between the second input disc 31 and the second output disc 33.

The respective discs 21, 23, 31, and 33 include disc-shaped base portions 21a, 23a, 31a, and 33a and projection portions 21b, 23b, 31b, and 33b that project from the base portions 21a, 23a, 31a, and 33a in an axial direction such that diameters thereof are gradually reduced. The discs 21, 23, 31, and 33 (the projection portions 21b, 23b, 31b, and 33b) include respective side surfaces 21ba, 23ba, 31ba, and 33ba each formed as a curved concave surface. The first input disc 21 and the first output disc 23 are disposed such that the projection portions 21b and 23b thereof are opposed to each other. A power roller 25, which will be described later, contacts the projection portions 21b and 23b. Similarly, the second input disc 31 and the second output disc 33 are disposed such that the projection portions 3 lb and 33b thereof are opposed to each other. A power roller 35, which will be described later, contacts the projection portions 31b and 33b.

Each of the power rollers 25 and 35 is supported by a thrust bearing and a trunnion, which is a known support member, so as to be rotatable about a roller shaft 41 and be tiltable about a tilt shaft located at a position skewed relative to the input shaft 3. The power rollers 25 and 35 supported thus are pressed against the side surfaces 21ba and 31ba of the input discs 21, 31 and the side surfaces 23ba and 33ba of the output disc 23 and 33, respectively, at high pressure by power of a pressing force adding mechanism (not shown) that generates a pressing force to the power rollers 25 and 35.

As shown in FIG. 1, the first toroidal transmission unit 13 and the second toroidal transmission unit 17 are disposed such that the input discs 21 and 31 thereof or the output discs 23 and 33 thereof are formed as separate members and are adjacent to each other in the axial direction. In other words, the first toroidal transmission unit 13 and the second toroidal transmission unit 17 are disposed such that back surfaces (bottom surfaces of the base portions 21a and 31a) 21aa and 31aa of the input discs 21 and 31 thereof or back surfaces (bottom surfaces of the base portions 23a and 33a) 23aa and 33aa of the output discs 23 and 33 thereof are opposed to each other. The first toroidal transmission unit 13 and the second toroidal transmission unit 17 in the present embodiment are disposed such that the back surfaces 21aa and 31aa of the input discs 21 and 31 thereof are opposed to each other. In the following description, a side of each toroidal transmission unit 13, 17 in the axial direction at which the toroidal transmission unit 13, 17 is adjacent to the other toroidal transmission unit 17, 13 (in the example of FIG. 1, the side at which the input discs 21 and 31 are disposed) is sometimes referred to as axially inner side, and the opposite side is sometimes referred to as axially outer side.

Figure 2:
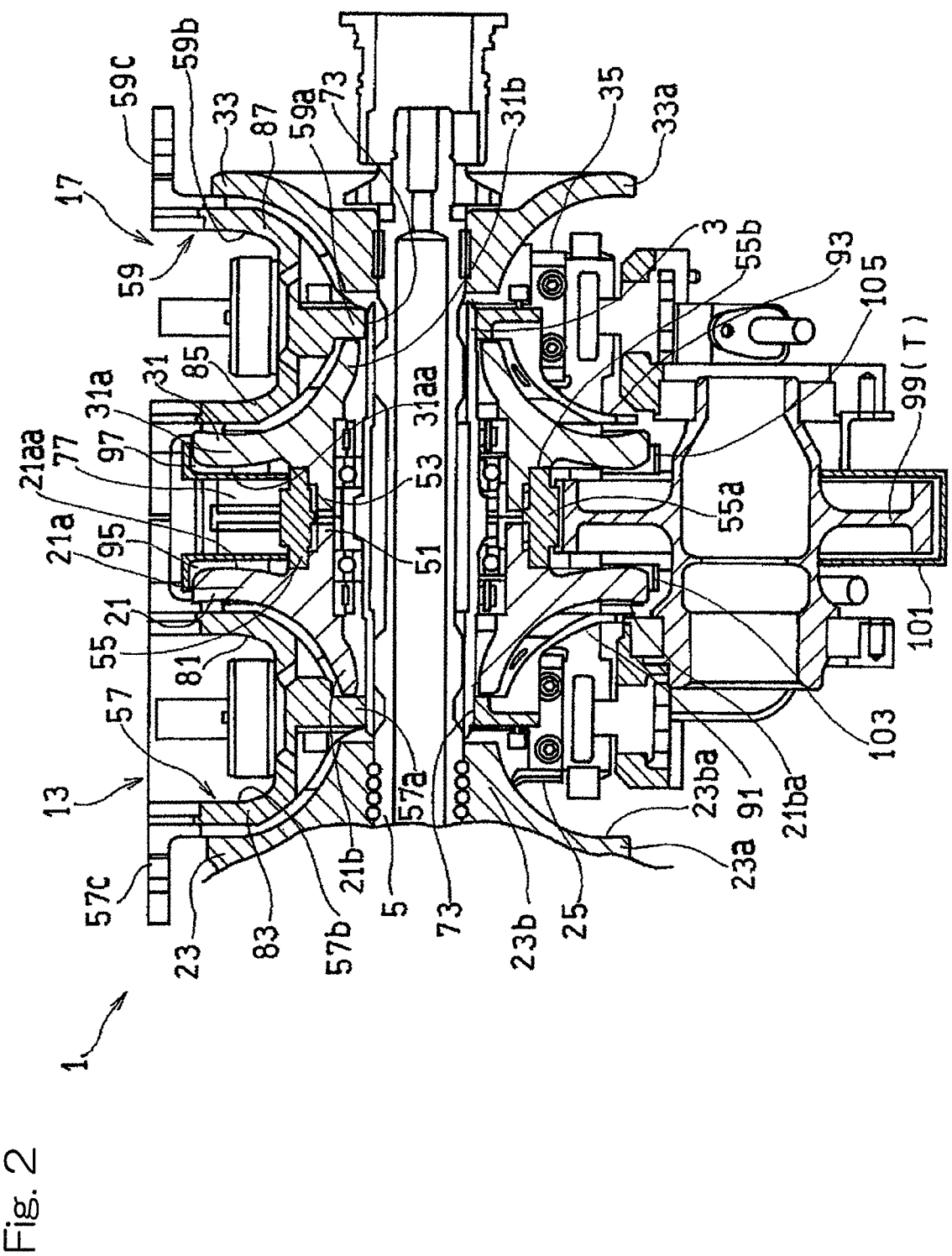
FIG. 2 is a longitudinal cross-sectional view showing a configuration example of the toroidal continuously variable transmission in FIG. 1.

As shown in FIG. 2, on the respective back surfaces 21aa and 31aa of the two discs (the first input disc 21 and the second input disc 31 in the illustrated example) disposed at the axially central portion of the continuously variable transmission 1 such that the back surfaces thereof are opposed to each other, tubular back surface cylinder walls 51 and 53 are respectively provided so as to project therefrom in the axial direction. The input gear 55 having an external tooth gear is connected over outer peripheral portions of both back surface cylinder walls 51 and 53 aligned in the axial direction. In other words, the input gear 55 is provided on the outer peripheral portions of both back surface cylinder walls 51 and 53 of the first input disc 21 and the second input disc 31 concentrically with these input discs 21 and 31. Power from the engine E (FIG. 1) is inputted via the input gear 55 to the continuously variable transmission 1.

The first input disc 21, the second input disc 31, and the input gear 55 are connected to each other so as to be non-rotatable relative to each other. In addition, the first input disc 21, the second input disc 31, and the input gear 55 are rotatably supported via respective bearings described below on the tubular input shaft 3 that is supported at both ends thereof by a first input disc support 57 and a second input disc support 59. The input gear 55 is rotatably supported on the input shaft 3 via gear supporting bearings that are provided at the inner diameter sides of both back surface cylinder walls 51 and 53 of the first input disc 21 and the second input disc 31. In the present embodiment, roller bearings are used as the gear supporting bearings. In addition, each of the first input disc 21 and the second input disc 31 is rotatably supported on the input shaft 3 via a disc radial direction supporting bearing and a disc axial direction supporting bearing. In the present embodiment, a cage-equipped roller bearing is used as the disc radial direction supporting bearing. In addition, an angular contact ball bearing is used as the disc axial direction supporting bearing.

A spline is formed on the inner peripheral surface of the input gear 55 and over the entire circumference thereof.

Meanwhile, a spline is formed also on each of the outer peripheral surfaces of both back surface cylinder walls 51 and 53 of the first input disc 21 and the second input disc 31 and over the entire circumference thereof. By fitting the splines at the disc side to the spline at the gear side, the input gear 55, the first input disc 21, and the second input disc 31 are connected to each other so as to be non-rotatable relative to each other.

The axial length of the cylindrical base portion 55b of the input gear 55 is set so as to be longer than the axial length of each external tooth 55a. One axial end of the base portion 55b is in contact with a portion, at the outer diameter side of the back surface cylinder wall 51, of the back surface 21aa of the first input disc 21, and the other axial end of the base portion 55b is in contact with a portion, at the outer diameter side of the back surface cylinder wall 53, of the back surface 31aa of the second input disc 31. That is, the first input disc 21 and the second input disc 31 are supported in the axial direction at the back surface side thereof by the input gear 55.

The outer peripheral end of each external tooth 55a of the input gear 55 is located radially inward of the outer peripheral end of the input gear 55. In addition, the radial position at which the base portion 55b of the input gear 55 is provided is preferably close to the outer peripheral ends of the input discs 21 and 31 in order to effectively suppress axial deformation of the input discs 21 and 31, that is, falling down due to loads received from the power rollers. Specifically, the radial position of the inner peripheral surface of the base portion 55b of the input gear 55 is preferably radially outward of the radial position of each of contact points between the projection portions 21b and 31b of the input discs 21 and 31 and the power rollers in a state where the tilt rotation angles of the power rollers are zero (deceleration ratio =1).

The first input disc support 57 and the second input disc support 59 each include an input shaft support portion 57a, 59a to which the input shaft 3 is fixed, a support intermediate portion 57b, 59b that axially branches from the input shaft support portion 57a, 59a into two sections, and connection pieces 57c, 59c provided at respective branched end portions of the support intermediate portion 57b, 59b and connected to a housing. Each of the input disc supports 57 and 59 formed thus has substantially a Y shape in a side view as shown in FIG. 2. In the following description, in each drawing, a side at which the connection pieces 57c and 59c of the input disc supports 57 and 59, which are connected to the housing, are provided is sometimes referred to as "upper side", for convenience sake.

Figure 3A:
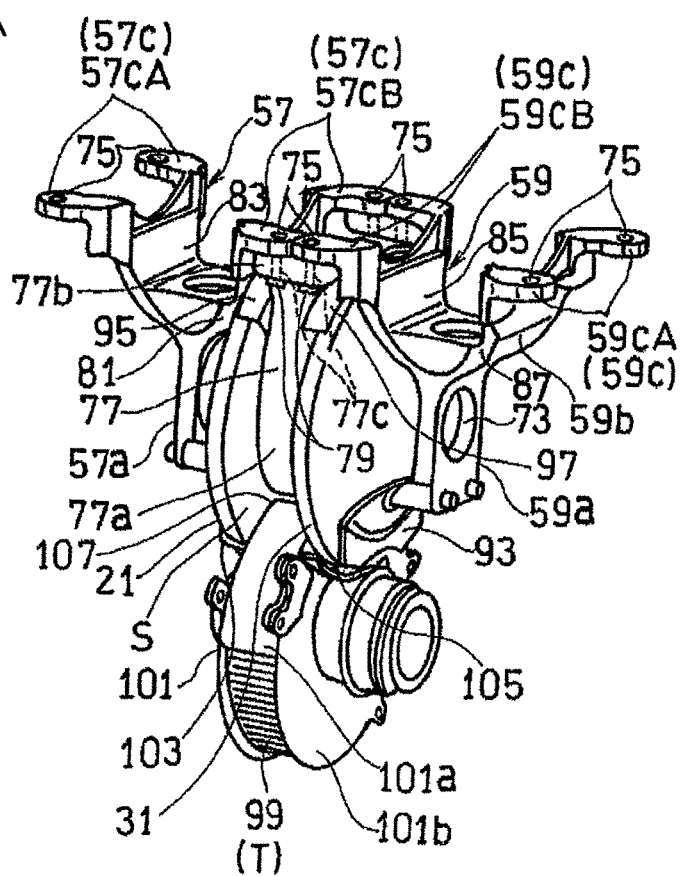
FIG. 3A is a perspective view showing each disc and a gear of the toroidal continuously variable transmission in FIG. 2.
Figure 3B:
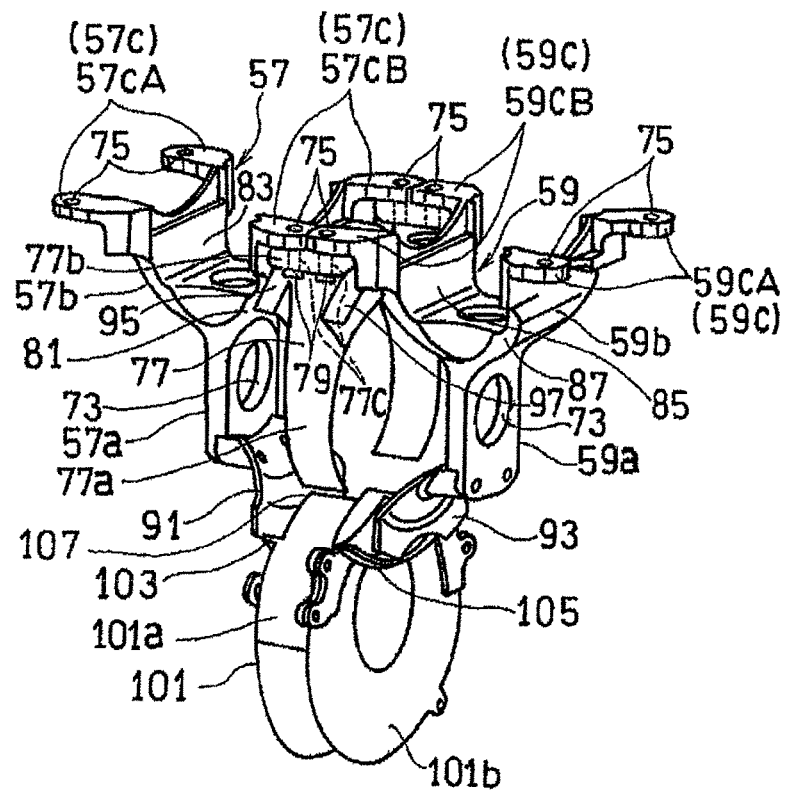
FIG. 3B is a perspective view showing the toroidal continuously variable transmission in FIG. 2, wherein each disc and the gear are omitted from FIG. 3A.

As shown in FIGS. 3A and 3B, the input shaft support portions 57a and 59a of the respective input disc supports 57 and 59 are formed with respective input shaft insertion holes 73, 73 that are axial through holes into which one end portion and another end portion of the input shaft 3 (FIG. 2) are inserted. Each of end portions of axially branched portions of each of the support intermediate portions 57b and 59b is further branched into two sections in a short direction orthogonal to the axial direction, and the connection piece 57c, 59c is formed at each of the four end portions in total. Specifically, the first input disc support 57 includes two axially outer side connection pieces 57cA, 57cA disposed at the axially outer side, and two axially inner side connection pieces 57cB, 57cB disposed at the axially inner side, and the second input disc support 59 includes two axially outer side connection pieces 59cA, 59cA disposed at the axially outer side, and two axially inner side connection pieces 59cB, 59cB disposed at the axially inner side. Each of the connection pieces 57cA, 57cB, 59cA, and 59cB, is formed with a connection member insertion hole 75, into which a connection member such as a bolt is inserted.

In the continuously variable transmission 1 according to the present embodiment shown in FIG. 2, a shroud that covers the input gear 55, the respective input discs 21 and 31, and the output discs 23 and 33, etc. is provided. Hereinafter, the structure of the shroud will be described in detail.

A portion of the outer periphery of the input gear 55 is covered with an input gear shroud 77. Specifically, both lateral side portions of the outer peripheral surface of the input gear 55 are covered with the input gear shroud 77 that is curved along this outer peripheral surface, via a gap. As shown in FIGS. 3A and 3B, the input gear shroud 77 includes a input gear shroud main body portion 77a that covers the lateral sides of the outer peripheral surface of the input gear 55, and an input gear shroud connection portion 77b that is provided at one end of the input gear shroud main body portion 77a. The input gear shroud connection portion 77b has two bolt insertion holes 77c, 77c arranged in the axial direction of the continuously variable transmission 1. In a state where one of the bolt insertion holes 77c overlaps the bolt insertion hole 75 of the axially inner side connection piece 57cB of the first input disc support 57, the input gear shroud 77 is fixed to the housing by means of a connection bolt 79, which is a common connection member. Similarly, in a state where the other bolt insertion hole 77c of the input gear shroud connection portion 77b overlaps the bolt insertion hole 75 of the axially inner side connection piece 59cB of the second input disc support 59, the input gear shroud 77 is fixed to the housing by means of a connection bolt 79, which is a common connection member.

A portion of the side surface 21ba of the first input disc 21 is covered with a first input disc side surface shroud 81. Specifically, a portion of the side surface 21ba of the first input disc 21 which portion is located above the input gear 55 is covered with the first input disc side surface shroud 81. The first input disc side surface shroud 81 is integrally provided to the first input disc support 57. The first input disc side surface shroud 81 in the present embodiment is formed as a one-piece member integrated with the first input disc support 57. In the illustrated example, a branched wall, at the axially inner side, of the support intermediate portion 57b of the first input disc support 57 forms the first input disc side surface shroud 81.

Furthermore, a portion of the side surface 23ba of the first output disc 23 which portion is located above the input gear 55 is covered with a first output disc side surface shroud 83. The first output disc side surface shroud 83 is integrally provided to the first input disc support 57. In the illustrated example, a branched wall, at the axially outer side, of the support intermediate portion 57b of the first input disc support 57 forms the first output disc side surface shroud 83. Also at the second toroidal transmission unit 17, with the same structure as that at the above first toroidal transmission unit 13, a portion of the side surface 31ba of the second input disc 31 is covered with a second input disc side surface shroud 85, and a portion of the side surface 33ba of the second output disc 33 is covered with a second output disc side surface shroud 87.

Moreover, another portion of the side surface 21ba of the first input disc 21 other than the portion covered with the first input disc side surface shroud 81, specifically, in the illustrated example, a portion thereof located below the input gear 55, is covered with an additional first input disc side surface shroud 91, which is integrally provided to the first input disc support 57. The additional first input disc side surface shroud 91 in the present embodiment is fixed to the first input disc support 57 by means of bolt connection. Similarly, a portion of the side surface 31ba of the second input disc 31 which portion is located below the input gear 55 is covered with an additional second input disc side surface shroud 93, which is integrally provided to the second input disc support 59 by being fixed thereto by means of bolt connection.

Regarding these disc side surface shrouds that cover the side surfaces of the respective discs, the first output disc side surface shroud 83 and the second output disc side surface shroud 87 may be omitted, for example, in the case where the circumferential speeds of the first output disc 23 and the second output disc 33 among the input discs 21 and 31 and the output discs 23 and 33 are set so as to be lower than the circumferential speeds of the first input disc 21 and the second input disc 31. In addition, an additional first output disc side surface shroud and an additional second output disc side surface shroud that cover portions of the respective side surfaces of the first and second output discs 23 and 33 which portions are located below the input gear 55 may be provided instead of the additional first input disc side surface shroud 91 and the additional second input disc side surface shroud 93, for example, in the case where the circumferential speeds of the first output disc 23 and the second output disc 33 are set so as to be lower than the circumferential speeds of the first input disc 21 and the second input disc 31.

Furthermore, a portion of an outer peripheral surface (i.e., the outer peripheral surface of the base portion 21a) 21ab of the first input disc 21 which outer peripheral surface faces in the radial direction is covered with a first input disc outer periphery shroud 95, and a portion of an outer peripheral surface (i.e., the outer peripheral surface of the base portion 31a) 31ab of the second input disc 31 which outer peripheral surface faces in the radial direction is covered with a second input disc outer periphery shroud 97. Specifically, the first input disc outer periphery shroud 95 and the second input disc outer periphery shroud 97 are integrally provided to the input gear shroud 77. In the present embodiment, the first input disc outer periphery shroud 95 and the second input disc outer periphery shroud 97 are formed as a one-piece member integrated with the input gear shroud 77. In addition, the first input disc outer periphery shroud 95 and the second input disc outer periphery shroud 97 cover an upper portion of the outer peripheral surface of the first input disc 21 and an upper portion of the outer peripheral surface of the second input disc 31, respectively.

In addition, the power transmission mechanism T (FIG. 1) includes a transmission gear 99, which transmits power directly to the input gear 55, provided with a transmission gear shroud 101 which covers the transmission gear 99. Specifically, the transmission gear shroud 101 includes a main body portion 101a that covers the outer periphery of the transmission gear 99, and side portions 101b that cover side portions of the transmission gear 99. The transmission gear 99 is in the form of an external tooth gear, and is engaged with the input gear 55 from lower side of the input gear 55. Thus, the transmission gear shroud 101 is provided below the input gear shroud 77. An additional first input disc outer periphery shroud 103 and an additional second input disc outer periphery shroud 105 that cover a portion of the outer peripheral surface of the first input disc 21 below the input gear 55 and a portion of the outer peripheral surface of the second input disc 31 below the input gear 55 are integrally provided on both side surfaces of the transmission gear shroud 101.

The transmission gear shroud 101 is formed separately from the input gear shroud 77 located above the transmission gear shroud 101. That is, an oil discharge opening 107 is formed between the main body portion 77a of the input gear shroud 77 and the transmission gear shroud main body portion 101a of the transmission gear shroud 101 which transmission gear shroud main body portion 101a is a portion covering the outer periphery of the transmission gear 99. Oil that is present around the input gear 55 and the transmission gear 99 is discharged through the oil discharge opening 107 to the outside of the shroud. The input gear shroud 77 and the transmission gear shroud 101 may be formed integrally. However, by forming the oil discharge opening 107 between the input gear shroud main body portion 77a and the transmission gear shroud main body portion 101a as in the present embodiment, the oil present around the input gear 55 and the transmission gear 99 is efficiently discharged to the outside of the shroud, so that oil agitation resistance is significantly reduced. From the standpoint that the oil present that is around the input gear 55 and the transmission gear 99 is efficiently discharged, the oil discharge opening 107 is preferably formed at least forward of the input gear shroud main body portion 77a and the transmission gear shroud main body portion 101a in the rotational direction.

The shrouds that cover the side surface and the outer peripheral surface of the same disc, that is, each disc side surface shroud 81, 85 and each disc outer periphery shroud 95, 97, are not joined to each other, and a gap is provided therebetween. The gap provided between each disc side surface shroud 81, 85 and each disc outer periphery shroud 95, 97 functions as a discharge groove for discharging oil having flowed to the inside of the shroud, to the outside of the shroud. In addition, the back surfaces of both discs 21 and 31 disposed at the axially central portion are not covered with any shroud. Therefore, a space S between the back surfaces of both discs 21 and 31 functions as a discharge space for discharging oil having flowed to the inside of each of the disc outer periphery shrouds 95 and 97, to the outside of the shroud.

The range in which each disc side surface shroud is provided is not particularly limited, but each disc side surface shroud preferably covers each disc side surface as wide as possible to such an extent that the disc side surface shroud does not interfere with the power roller 25, 35 that is in contact with the side surface (concave surface) of each disc.

In the toroidal continuously variable transmission 1 according to the present embodiment, which is the double-cavity-type toroidal continuously variable transmission 1, by forming the two input discs 21 and 31 adjacent to each other at the axially central portion as members separate from each other and disposing the input gear 55, which inputs power to the input discs 21 and 31, between the back surfaces of the two discs disposed such that the back surfaces 21aa and 31aa thereof are opposed to each other, the outer diameter (i.e., the circumferential speed) of the input gear can be decreased to reduce oil agitation loss by the input gear 55. Furthermore, by covering the respective input discs 21 and 31 and output discs 23 and 33 with the disc shrouds, extra oil that is present around both discs 21 and 31 is prevented from coming into contact with the surfaces of the discs, so that the oil agitation resistance can be further reduced. Moreover, since the shrouds that cover the side surfaces and the outer peripheral surfaces of the input discs 21 and 31 are integrally provided to the input disc supports 57 and 59 and the input gear shroud 77, an increase in the size of the entire device is suppressed.

In the present embodiment, the example has been shown in which the respective input discs 21 and 31 of the first toroidal transmission unit 13 and the second toroidal transmission unit 17 are disposed at the axially central portion of the entire continuously variable transmission 1 such that the back surfaces thereof are opposed to each other. However, the respective output discs 23 and 33 may be disposed at the axially central portion of the entire continuously variable transmission 1 such that back surfaces 23aa and 33aa thereof are opposed to each other. The continuously variable transmission 1 is preferably configured thus particularly when the continuously variable transmission 1 is used with such setting that the rotation speed at the output discs 23 and 33 side is higher than that at the input side. In the case where the output discs 23 and 33 are disposed so as to be adjacent to each other in the axially central portion, an output gear is disposed between the respective back surfaces 23aa and 33aa of the output discs 23 and 33, and the output gear and the respective discs are covered with shrouds similarly as described above.

In the description of each of the above-described embodiments, the toroidal continuously variable transmission used in the IDG for an aircraft has been described as an example. However, the use of the toroidal continuously variable transmission to which the present invention is applied is not limited to an aircraft, and may be, for example, for an automobile.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Continuously variable transmission
13 . . . First transmission unit
17 . . . Second transmission unit
21 . . . First input disc
21aa . . . Back surface of first input disc
21ab . . . Outer peripheral surface of first input disc
21ba . . . Side surface of first input disc
23 . . . First output disc
25 . . . First power roller
31 . . . Second input disc
31aa . . . Back surface of second input disc
31ab . . . Outer peripheral surface of second input disc
31ba . . . Side surface of second input disc
33 . . . Second output disc
35 . . . Second power roller
55 . . . Input gear
57 . . . First input disc support
59 . . . Second input disc support
77 . . . Input gear shroud
81 . . . First input disc side surface shroud
83 . . . First output disc side surface shroud
85 . . . Second input disc side surface shroud
87 . . . Second output disc side surface shroud
91 . . . Additional first input disc side surface shroud
93 . . . Additional second input disc side surface shroud
95 . . . First input disc outer periphery shroud
97 . . . Second input disc outer periphery shroud

What is claimed is:

1. A toroidal continuously variable transmission comprising:
a first transmission unit including:
a first input disc and a first output disc disposed coaxially with each other and each having a curved concave side surface; and
a first power roller tiltably interposed between the first input disc and the first output disc and configured to change a speed of a driving force from the first input disc and transmit the driving force to the first output disc;
a second transmission unit disposed coaxially with the first transmission unit, the second transmission unit including:
a second input disc and a second output disc disposed coaxially with each other and each having a curved concave side surface; and
a second power roller tiltably interposed between the second input disc and the second output disc and configured to change a speed of a driving force from the second input disc and transmit the driving force to the second output disc, the second transmission unit being disposed such that a back surface of the second input disc is opposed to a back surface of the first input disc;
an input gear disposed between the back surface of the first input disc and the back surface of the second input disc and concentrically with the first input disc and the second input disc, and having an external tooth gear connected to the first input disc and the second input disc so as to be non-rotatable relative to the first input disc and the second input disc to input power;
an input gear shroud covering a portion of an outer periphery of the input gear;
a first input disc support supporting the first input disc on a housing of the continuously variable transmission and a second input disc support supporting the second input disc on the housing of the continuously variable transmission;
a first input disc side surface shroud formed from a single piece of material with the first input disc support and covering a portion of the side surface of the first input disc;
a second input disc side surface shroud formed from a single piece of material with the second input disc support and covering a portion of the side surface of the second input disc;
a first input disc outer periphery shroud formed from a single piece of material with the input gear shroud and covering a portion of an outer peripheral surface of the first input disc; and
a second input disc outer periphery shroud formed from a single piece of material with the input gear shroud and covering a portion of an outer peripheral surface of the second input disc,
wherein the first input disc outer periphery shroud and the second input disc outer periphery shroud are formed from a single piece of material with the input gear shroud to form a one-piece member.

2. The toroidal continuously variable transmission as claimed in claim 1, further comprising additional disc side surface shrouds that cover other portions of the side surfaces of the discs whose circumferential speeds are set higher, of the first and second input discs and the first and second output discs, formed from a single piece of material with the first input disc support and the second input disc support, respectively.

3. The toroidal continuously variable transmission as claimed claim 1, wherein the input gear shroud is fixed to the housing by a connection member that fixes the first input disc support to the housing and a connection member that fixes the second input disc support to the housing.

4. The toroidal continuously variable transmission as claimed in claim 1, further comprising: a transmission gear engaged with the input gear to transmit power from an external power source to the input gear; and a transmission gear shroud covering a side portion and an outer periphery of the transmission gear, wherein an oil discharge opening is formed between the input gear shroud and the transmission gear shroud.

5. A toroidal continuously variable transmission comprising:
- a first transmission unit including:
  - a first input disc and a first output disc disposed coaxially with each other and each having a curved concave side surface; and
  - a first power roller tiltably interposed between the first input disc and the first output disc and configured to change a speed of a driving force from the first input disc and transmit the driving force to the first output disc;
- a second transmission unit disposed coaxially with the first transmission unit, the second transmission unit including:
  - a second input disc and a second output disc disposed coaxially with each other and each having a curved concave side surface; and
  - a second power roller tiltably interposed between the second input disc and the second output disc and configured to change a speed of a driving force from the second input disc and transmit the driving force to the second output disc, the second transmission unit being disposed such that a back surface of the second output disc is opposed to a back surface of the first output disc;
- an output gear disposed between the back surface of the first output disc and the back surface of the second output disc and concentrically with the first output disc and the second output disc, and having an external tooth gear connected to the first output disc and the second output disc so as to be non-rotatable relative to the first output disc and the second output disc to output power;
- an output gear shroud covering a portion of an outer periphery of the output gear;
- a first output disc support supporting the first output disc on a housing of the continuously variable transmission and a second output disc support supporting the second output disc on the housing of the continuously variable transmission;
- a first output disc side surface shroud formed from a single piece of material with the first output disc support and covering a portion of the side surface of the first output disc;
- a second output disc side surface shroud formed from a single piece of material with the second output disc support and covering a portion of the side surface of the second output disc;
- a first output disc outer periphery shroud formed from a single piece of material with the output gear shroud and covering a portion of an outer peripheral surface of the first output disc; and
- a second output disc outer periphery shroud formed from a single piece of material with the output gear shroud and covering a portion of an outer peripheral surface of the second output disc,
wherein the first output disc outer periphery shroud and the second output disc outer periphery shroud are formed from a single piece of material with the output gear shroud to form a one-piece member.

6. A toroidal continuously variable transmission comprising:
- a first transmission unit including:
  - a first input disc and a first output disc disposed coaxially with each other and each having a curved concave side surface; and
  - a first power roller tiltably interposed between the first input disc and the first output disc and configured to change a speed of a driving force from the first input disc and transmit the driving force to the first output disc;
- a second transmission unit disposed coaxially with the first transmission unit, the second transmission unit including:
  - a second input disc and a second output disc disposed coaxially with each other and each having a curved concave side surface; and
  - a second power roller tiltably interposed between the second input disc and the second output disc and configured to change a speed of a driving force from the second input disc and transmit the driving force to the second output disc, the second transmission unit being disposed such that a back surface of the second input disc is opposed to a back surface of the first input disc;
- an input gear disposed between the back surface of the first input disc and the back surface of the second input disc and concentrically with the first input disc and the second input disc, and having an external tooth gear connected to the first input disc and the second input disc so as to be non-rotatable relative to the first input disc and the second input disc to input power;
- an input gear shroud covering a portion of an outer periphery of the input gear;
- a first input disc support supporting the first input disc on a housing of the continuously variable transmission and a second input disc support supporting the second input disc on the housing of the continuously variable transmission;
- a first input disc side surface shroud formed from a single piece of material with the first input disc support and covering a portion of the side surface of the first input disc;
- a second input disc side surface shroud formed from a single piece of material with the second input disc support and covering a portion of the side surface of the second input disc;
- a first input disc outer periphery shroud formed from a single piece of material with the input gear shroud and covering a portion of an outer peripheral surface of the first input disc;
- a second input disc outer periphery shroud formed from a single piece of material with the input gear shroud and covering a portion of an outer peripheral surface of the second input disc; and a transmission gear engaged with the input gear to transmit power from an external power source to the input gear; and a transmission gear shroud covering a side portion and an outer periphery of the transmission gear, wherein an oil discharge opening is formed between the input gear shroud and the transmission gear shroud.

\* \* \* \* \*